United States Patent
Snitzer et al.

(10) Patent No.: US 11,120,040 B2
(45) Date of Patent: Sep. 14, 2021

(54) MULTI-LEDGER BLOCKCHAIN MANAGEMENT

(71) Applicant: International Business Machines Corporation, Armonk, NY (US)

(72) Inventors: Brian James Snitzer, Lancaster, PA (US); David Dwayne Weck, Santa Rosa Beach, FL (US); Brian M. O'Connell, Wake, NC (US); Ann Corrao, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 16/364,348

(22) Filed: Mar. 26, 2019

(65) Prior Publication Data

US 2020/0311101 A1 Oct. 1, 2020

(51) Int. Cl.
*G06F 16/00* (2019.01)
*G06F 16/27* (2019.01)
*G06F 16/245* (2019.01)

(52) U.S. Cl.
CPC ............ *G06F 16/27* (2019.01); *G06F 16/245* (2019.01)

(58) Field of Classification Search
CPC ........ G06F 16/27; G06F 16/245; G06F 21/64; G06F 16/9024; H04L 2209/38; H04L 9/3236; H04L 9/3239; H04L 9/3297; G06Q 99/00; G06Q 2220/00; G06Q 10/10

See application file for complete search history.

(56) References Cited

U.S. PATENT DOCUMENTS

| | | | |
|---|---|---|---|
| 9,785,369 B1 | 10/2017 | Ateniese | |
| 10,110,576 B2 | 10/2018 | Ateniese | |
| 2005/0240411 A1* | 10/2005 | Yacoub | H04M 3/493 704/270 |
| 2016/0292680 A1 | 10/2016 | Wilson, Jr. | |
| 2017/0103385 A1 | 4/2017 | Wilson, Jr. | |

(Continued)

OTHER PUBLICATIONS

Patterson, D. How the blockchain can help track important messages and prevent email fraud. TechRepublic. https://www.techrepublic.com/article/how-blockchain-technology-can-help-track-important-messages-and-prevent-email-fraud/ (Year: 2018).*

(Continued)

*Primary Examiner* — Syed H Hasan
(74) *Attorney, Agent, or Firm* — Joseph P. Curcuru; Gilbert Harmon, Jr.

(57) ABSTRACT

Embodiments of the present invention describe an approve for ledger synchronization. Embodiments monitor conversations for keywords, and responsive to detecting the keywords, recording at least a portion of the conversations that includes the keywords. Additionally, embodiments store recorded conversation, based on the at least portion of the conversations that include the keywords, in a database, detect changes to ledgers, and determine authorization records is absent on the ledgers for the changes. Furthermore, embodiments, determine at least one of the stored conversations includes authorization records associated with the detected changes, retrieve the determined at least one of stored conversations, and synchronize the ledgers by creating a new block to the ledgers indicating authorization for the new block based on the determined at least one of stored conversations.

20 Claims, 4 Drawing Sheets

(56) References Cited

U.S. PATENT DOCUMENTS

| | | | | |
|---|---|---|---|---|
| 2017/0124556 | A1* | 5/2017 | Seger, II | H04L 69/40 |
| 2017/0293669 | A1* | 10/2017 | Madhavan | G06F 16/2365 |
| 2018/0018738 | A1* | 1/2018 | Bernauer | G06F 21/00 |
| 2018/0253451 | A1* | 9/2018 | Callan | H04L 63/123 |
| 2018/0315046 | A1* | 11/2018 | Joao | G09C 5/00 |
| 2019/0020629 | A1* | 1/2019 | Baird, III | H04L 9/0869 |
| 2019/0229915 | A1* | 7/2019 | Digiambattista | H04L 9/321 |
| 2020/0097965 | A1* | 3/2020 | Castoro | G06Q 20/209 |
| 2020/0099530 | A1* | 3/2020 | Khatib | H04L 9/085 |
| 2020/0250747 | A1* | 8/2020 | Padmanabhan | G06N 5/04 |
| 2020/0320222 | A1* | 10/2020 | Zhou | H04L 9/3247 |

OTHER PUBLICATIONS

M. Laskowski and H. M. Kim, "Rapid Prototyping of a Text Mining Application for Cryptocurrency Market Intelligence," 2016 IEEE 17th International Conference on Information Reuse and Integration (IRI), pp. 448-453, doi: 10.1109/IRI.2016.66. (Year: 2016).*

"A system and method to integrate Blockchain into ITSM Change Management", An IP.com Prior Art Database Technical Disclosure, Disclosed Anonymously, IP.com No. IPCOM000251044D, IP.com Electronic Publication Date: Oct. 4, 2017, 4 pages.

"Centralized role based access control management system based on OAuth and Blockchain", An IP.com Prior Art Database Technical Disclosure, Disclosed Anonymously, IP.com No. IPCOM000252233D, IP.com Electronic Publication Date: Dec. 29, 2017, 6 pages.

"Distributed Ledger Technology, Blockchains and Identity", A Regulatory Overview, GSMA, Sep. 2018, 34 pages.

"Method and System for Protecting Blockchain and Hyperledger Data Privacy and Confidentiality", An IP.com Prior Art Database Technical Disclosure, Disclosed Anonymously, IP.com No. IPCOM000256627D, IP.com Electronic Publication Date: Dec. 17, 2018, 6 pages.

Kayam, et al., "Blockchain Basics: Overview of Distributed Ledger Technology, Application in Health Care, and Legal Considerations", © 2019 Waller Lansden Dortch & Davis, LLP, Nashville, TN, pp. 11-13, <www.wallerlaw.com/portalresource/Blockchain-Basics>.

Mell et al., "The NIST Definition of Cloud Computing", National Institute of Standards and Technology, Special Publication 800-145, Sep. 2011, 7 pages.

* cited by examiner

MULTI-LEDGER BLOCKCHAIN MANAGEMENT

BACKGROUND OF THE INVENTION

The present invention relates generally to the field of authorization ledgers (i.e., blockchain), and more particularly to managing and resynchronizing one or more authorization ledgers.

Blockchain is a growing list of records, called blocks, which are linked using cryptography. Each block in a blockchain contains a cryptographic hash of the previous block, a timestamp, and transaction data (generally represented as a Merkle tree root hash). By design, a blockchain is resistant to modification of the data. It is an open, distributed ledger that can record transactions between two or more parties efficiently and in a verifiable and permanent way. For use as a distributed ledger, blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. Although blockchain records are ultimately alterable, blockchains may be considered secure by design and exemplify a distributed computing system with high Byzantine fault tolerance.

A blockchain is a decentralized, distributed, and public digital ledger that is used to record transactions across many computers so that any involved record cannot be altered retroactively, without the alteration of all subsequent blocks. This allows the participants to verify and audit transactions independently and relatively inexpensively. A blockchain database is managed autonomously using a peer-to-peer network and a distributed timestamping server. A blockchain is authenticated by mass collaboration powered by collective self-interests. Such a design facilitates robust workflow where participants' uncertainty regarding data security is marginal. The use of a blockchain removes the characteristic of infinite reproducibility from a digital asset. Blockchain confirms that each unit of value was transferred only once, solving the long-standing problem of double spending. A blockchain has been described as a value-exchange protocol. A blockchain can maintain title rights because, when properly set up to detail the exchange agreement, it provides a record that compels offer and acceptance.

Blocks hold batches of valid transactions that are hashed and encoded into a Merkle tree. Each block includes the cryptographic hash of the prior block in the blockchain, linking the two blocks together, wherein the linked blocks form a chain. This iterative process confirms the integrity of the previous block, all the way back to the original genesis block. Sometimes separate blocks can be produced concurrently, creating a temporary fork. In addition to a secure hash-based history, any blockchain has a specified algorithm for scoring different versions of the history so that a block or blockchain with a higher value can be selected over others. Blocks not selected for inclusion in the chain are called orphan blocks. Peers supporting the database have different versions of the history from time to time. The peers keep only the highest-scoring version of the database known to them.

Whenever a peer receives a higher-scoring version (usually the old version with a single new block added) the peer extends or overwrite their own database and retransmit the improvement to their peers. Blockchains are typically built to add the score of new blocks onto old blocks and are given incentives to extend with new blocks rather than overwrite old blocks. Therefore, the probability of superseding an entry decreases as more blocks are built on top of the previous block. For example, bitcoin uses a proof-of-work system, where the chain with the most cumulative proof-of-work is considered the valid chain by the network. Within a blockchain the computation is carried out redundantly rather than in the traditional segregated and parallel manner.

By storing data across blockchains peer-to-peer network, the blockchain eliminates a number of risks that come with data being held centrally. The decentralized blockchain may use ad-hoc message passing and distributed networking. Peer-to-peer blockchain networks lack centralized points of vulnerability that computer hackers can exploit; likewise, peer-to-peer (P2P) blockchain networks have no central point of failure. Blockchain security methods include the use of public-key cryptography. A public key (a long, random-looking string of numbers) is an address on the blockchain. Value tokens sent across the network are recorded as belonging to that address. A private key is essentially a password that gives a blockchain's owner access to the blockchain's owner's digital assets or the means to otherwise interact with the various capabilities that blockchains now support. Data stored on the blockchain is generally considered incorruptible.

Every node in a decentralized system has a copy of the blockchain. Data quality is maintained by massive database replication and computational trust. No centralized "official" copy exists, and no user is "trusted" more than any other. Transactions are broadcast to the network using software. Messages are delivered on a best-effort basis. Mining nodes validate transactions, add the transactions to the block the mining nodes are building, and then broadcast the completed block to other nodes. Blockchains use various time-stamping schemes, such as proof-of-work, to serialize changes. Alternative consensus methods include proof-of-stake. Growth of a decentralized blockchain is accompanied by the risk of centralization because the computer resources required to process larger amounts of data become more expensive.

SUMMARY

Embodiments of the present invention disclose a method, a computer program product, and a system for ledger synchronization, the method comprising: monitoring, by one or more processors, one or more conversations for one or more keywords; responsive to detecting the one or more keywords, recording, by the one or more processors, at least a portion of the one or more conversations that includes the one or more keywords; storing, by the one or more processors, one or more recorded conversation, based on the at least portion of the one or more conversations that include the one or more keywords, in a database; detecting, by the one or more processors, one or more changes to one or more ledgers; determining, by the one or more processors, one or more authorization records is absent on the one or more ledgers for the one or more changes; determining, by the one or more processors, at least one of the one or more stored conversations includes authorization records associated with the one or more detected changes; retrieving, by the one or more processors, the determined at least one of one or more stored conversations; and synchronizing, by the one or more processors, the one or more ledgers by creating a new block to the one or more ledgers indicating authorization for the new block based on the determined at least one of one or more stored conversations.

DETAILED DESCRIPTION

Commonly, during emergency or other urgent situations, changes executed outside of a defined organization process can automatically update one or more authorized ledgers (e.g., blockchains). For example, a customer experiencing an urgent issue and a down condition requiring a quick bypass of the normal authorized flow can update an authorized ledger, wherein the quick bypass and updating of the authorized ledger can cause one or more blockchains to go out of sync. Embodiments of the present invention can determine when to engage one or more authorization checking processes through recording a phone call, a digital chat, a text, a conversation, or any other form of communication in the art. Additionally, embodiments of the present invention can determine when one or more authorized ledgers (e.g., blockchains) is out of sync. This enables the authorized ledger to resynchronize by mining for authorized changes to a ledger (e.g., an authorization ledger).

Currently, authorized ledgers can become unsynchronized during execution events; therefore, there is a need to resynchronize one or more authorized ledgers when the one or more authorized ledgers become unsynchronized. Embodiments of the present invention provide a solution to this problem by monitoring and mining for one or more changes (e.g., order authorizations, or any other authorizations known in the art) to the ledger systems and monitoring and mining digital chats, texts, recorded phone calls, or any other form of communication known in the art to determine if the changes made outside the authorized ledger (e.g., out of band authorization) are indeed authorized but not recorded. An out of band authorization is an authorization given outside of the ledger system via a phone call, email, etc. Embodiments of the present invention can update the one or more authorized ledgers with an additional block added to the blockchain when it is determined there was an authorization made out of band. Embodiments of the present invention improve the current art by enabling the resynchronization of multiple ledgers when one or more ledgers in a multi-ledger system are no longer synchronized. Embodiments of the present invention improve the art by enabling authorization ledgers to resynchronize when one or more out of band authorizations occur resulting in the one or more authorization ledgers becoming unsynchronized with the other related authorization ledgers.

Implementation of embodiments of the invention may take a variety of forms, and exemplary implementation details are discussed subsequently with reference to the Figures (i.e., FIG.).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It can also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations can be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Figure 1A:
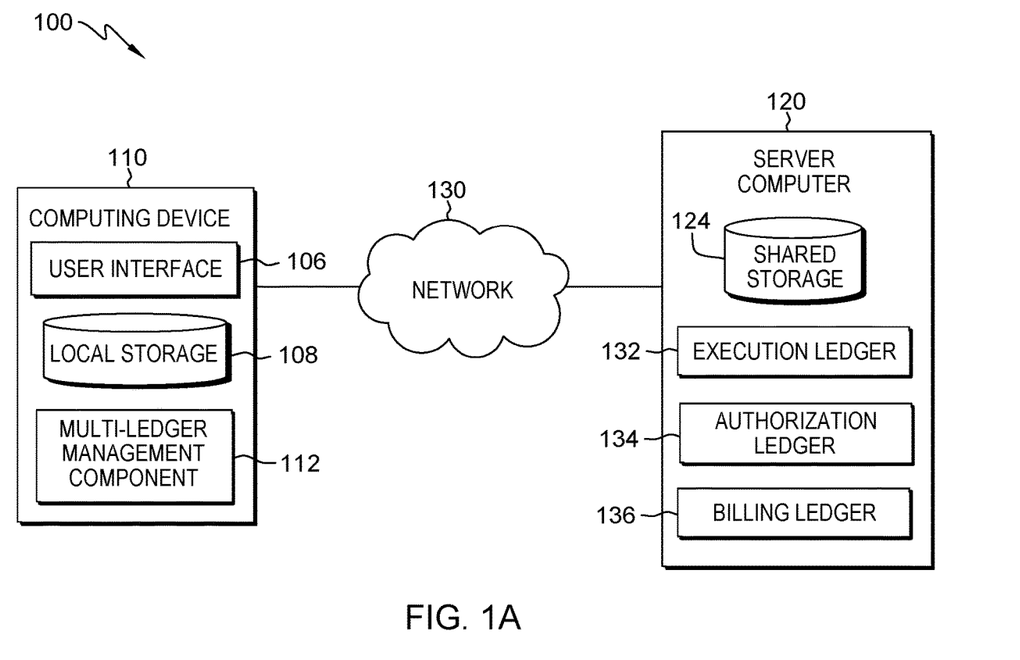
FIG. 1A is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110, server computer 120, and multi-ledger management component (MLMC) 112 interconnected over network 130.

Network 130 can be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 130 can include one or more wired and/or wireless networks that can receive and transmit data, voice, and/or video signals, including multimedia signals that include voice, data, text and/or video information. In various embodiments, network 130 can be a peer to peer (P2P) network. In general, network 130 can be any combination of connections and protocols that will support communications between computing device 110, MLMC 112, shared storage 124, and server computer 120, and any other computing devices and/or storage devices (not shown in FIG. 1A) within distributed data processing environment 100. In some embodiments, distributed data processing environment 100 can represent a P2P network communication between computing device 110, MLMC 112, shared storage 124, and server computer 120, and any other computing devices and/or storage devices (not shown in FIG. 1A).

In various embodiments, computing device 110 can be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), and/or any programmable electronic computing device capable of communicating with various components and devices within distributed data processing environment 100, via network 130 or any combination therein. In general, computing device 110 can be representative of any programmable computing device or a combination of programmable computing devices capable of executing machine-readable program instructions and communicating with users of other computing devices via network 130, capable of executing machine-readable program instructions and communicating with server computer 120. It should be noted that a user is a client and/or service provider who has access to computing device 110 and/or the ledger system.

In other embodiments, computing device 110 can represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. In the depicted embodiment, computing device 110 can include user interface (UI) 106 and local storage 108. In various embodiments, not depicted in FIG. 1A, computing device 110 can have one or more user interfaces. In other embodiments, not depicted in FIG. 1A, environment 100 can comprise one or more computing devices, one or more server computers, and/or one or more networks.

User interface (UI) 106 provides an interface to MLMC 112 via network 130 for a user of computing device 110 or server computer 120. In various embodiments, UI 106 can enable a user, a client, or both to interact with MLMC 112, computing device 110, server computer 120, or any combination thereof. For example, a computer system and display screen enabling a user to send program instructions, receive program instructions, send messages, receive messages, update data, send data, input data, edit data, collect data, receive data, or any combination thereof from a server or a program. In one embodiment, UI 106 can be a graphical user interface (GUI) or a web user interface (WUI) and can display text, documents, web browser windows, user options, application interfaces, and instructions for operation. UI 106 can include information such as graphic, text, and sound. UI 106 can enable a program to be presented to a user and enable control sequences the user employs to control the program. In another embodiment, UI 106 can be a mobile application software providing an interface between a user of computing device 110 and server computer 120. Mobile application software, or an "app," can be a computer program designed to run on smart phones, tablet computers and other computing devices. In an embodiment, UI 106 can enable the user of computing device 110 to send data, input data, edit data (annotations), collect data and/or receive data.

Server computer 120 can be a standalone computing device, a management server, a web server, a mobile computing device, one or more client servers, or any other electronic device or computing system capable of receiving, sending, and processing data. In other embodiments, server computer 120 can represent a server computing system utilizing multiple computers such as, but not limited to, a server system, such as in a cloud computing environment. In another embodiment, server computer 120 can represent a computing system utilizing clustered computers and components (e.g., database server computers, application server computers, etc.) that act as a single pool of seamless resources when accessed within distributed data processing environment 100. Server computer 120 can include internal and external hardware components, as depicted, and described in further detail with respect to FIG. 3. In various embodiments, not depicted in FIG. 1A, sever computer 120 can house a change record that monitors and keeps track of changes to one or more ledgers (e.g., execution ledger 132, authorization ledger 134, and billing ledger 136). In various embodiments, the change record can communicate with MLMC 112 and can alert MLMC 112 when one or more changes occur to one or more ledgers. In some embodiments, the change record can be a component of MLMC 112 and can be housed anywhere within distributed data processing environment 100 as long as MLMC 112 is connected to network 130.

In the depicted embodiment execution ledger 132, authorization ledger 134, and billing ledger 136 are housed on server computer 120. In other embodiments, not depicted in FIG. 1A, execution ledger 132, authorization ledger 134, and billing ledger 136 can each be separately housed on one or more server computers. In other embodiments, execution ledger 132, authorization ledger 134, and billing ledger 136 can each be anywhere within distributed data processing environment 100. In various embodiments, execution ledger 132, authorization ledger 134, and billing ledger 136 each correspond to separate ledger systems that communicate with each other. In other embodiments, execution ledger 132, authorization ledger 134, and billing ledger 136 can each correspond to the same ledger system.

Each of shared storage 124 and local storage 108 can be a data/knowledge repository and a database that can be written and read by one or a combination of MLMC 112, server computer 120, and computing device 110. In the depicted embodiment, shared storage 124 resides on server computer 120 and local storage 108 resides on computing device 110. In another embodiment, shared storage 124 and local storage 108 can each reside elsewhere within distributed data processing environment 100, provided that each can access at least one of computing device 110 and server computer 120 and each are accessible by at least one of computing device 110 and server computer 120. Shared storage 124 and local storage 108 can each be implemented with any type of storage device capable of storing data and configuration files that can be accessed and utilized by server computer 120, computing device 110, or any combination thereof, such as, but not limited to, a database server, a hard disk drive, or a flash memory. In other embodiments, shared storage 124 and local storage 108 can each be a hard drive, a memory card, a computer output to laser disc (cold storage), or any form of data storage known in the art. In some embodiments, shared storage 124 and local storage 108 can each be one or more cloud storage systems or databases linked to a cloud network.

In the depicted embodiment, MLMC 112 is located on computer device 110. In other embodiments, MLMC 112 can be on server computer 120, one or more computing device 110 (not depicted in FIG. 1A), or anywhere within distributed data processing environment 100. In some embodiments, MLMC 112 can be on one or more servers, one or more computing devices, or any combination thereof. In some embodiments, not depicted in FIG. 1A, MLMC 112 can be a standalone component on computing device 110 or server computer 120. In various embodiments, MLMC 112 can continuously monitor and detect at least one of: phone calls, email, texts, and/or any form of communication or electronic communication known in the art. In various embodiments, MLMC 112 can monitor a conversation for predetermined keywords using natural language processing. In various embodiments, when MLMC 112 determines it hears a predetermined keyword MLMC 112 begins recording the conversation. It should be noted herein that a conversation can be any form of communication known in the art.

It should be noted herein that in the described embodiments, all participating parties have consented to being recorded and monitored, and all participating parties are aware of the potential that such recording and monitoring may be taking place. In various embodiments, for example, phone calls begin with an audible notification stating that the calls are being monitored and may be recorded for the purpose of verifying change management approvals. Similarly, in various embodiments, emails and texts begin with a written notification that communications are being monitored and may be saved, again for the purpose of verifying approval of various change management-related activity. These embodiments may also include periodic reminders of such recording and monitoring throughout the course of any such communications. Certain embodiments may also include regular (e.g. daily, weekly, monthly) reminders to the participating parties that they have consented to being recorded and monitored for change management verification-related purposes, and may provide the participating parties with the opportunity to opt-out of such recording and monitoring if desired.

A predetermined keyword can be any one or more words, one or more phrases, or any combination of the two associated with authorization or transaction known in the art such as, but not limited to, authorization, transaction, approval, I approve, I authorize, deal, do we have a deal, etc. In various embodiments, the predetermined keywords can be edited by a user via UI 106 and can be continually updated. In various embodiments, MLMC 112 can start recording a conversation (again, assuming proper consent has been provided) when MLMC 112 identifies a predetermined keyword within a predetermined range of confidence. For example, a user sets the range of confidence to be between 80 percent confident to 99 percent confident. In this particular example, when MLMC 112, using a natural language processing, is at least 80 percent confident a user said "authorization" then MLMC 112 will begin recording the conversation. It should be noted that MLMC 112 can use a predetermined threshold of confidence instead of a predetermined range of confidence.

In various embodiments, MLMC 112 can store a recorded conversation on shared storage 124, local storage 108, or a combination of the two, in which MLMC 112 can retrieve and use to verify authorization approval at a later time. In some embodiments, MLMC 112 can send instructions for computing device 110 and/or server computer 120 to start and stop actively recording a conversation. In various embodiments, MLMC 112 can tag a stored recorded conversation with a unique identification tag. For example, a unique identification tag can be, but is not limited to, information associated with the customer (e.g., customer name or customer number), user name, user identification (ID), phone number, email address, predetermined keywords, content of text transcript, date and time of conversation, or any combination thereof. In various embodiments, MLMC 112 can store customer, authorization and/or transaction information as metadata. Metadata can include, but is not limited to time and/or date information, place, triggering keyword, duration of a recording, transaction details, etc.

In some embodiments, MLMC 112 can record and store a conversation for a predetermined time period after being triggered by a predetermined keyword. For example, MLMC 112 records the conversation for 30 seconds after detecting a user say, "I authorize the transaction." Additionally, in other embodiments, MLMC 112 can record a predetermined selected portion of a conversation for a predetermined time before and after being triggered by a predetermined keyword. For example, MLMC 112 continuously records a conversation: however, MLMC 112 stores 15 seconds of the recording prior to the predetermined keyword triggering MLMC 112 (e.g., recording sequence) and 1 minute after the predetermined keyword triggers the recording sequence. In a different example, a service provider and a client are texting each other for months. In this particular example, MLMC 112 parses and searches the text thread for one or more predetermined keywords. In this particular example, MLMC 112 identifies a text stating "I will get this order approved." In this particular example, MLMC 112 stores the past 30 days of text thread from the identified keyword. In various embodiments, a stored conversation can be stored for a predetermined time frame. For example, storing a conversation for 1 year before clearing the stored conversation from a database.

In one particular embodiment, MLMC 112 records the entire conversation but only stores the conversation with a tag indicating the conversation might be pertinent to a ledger transaction on computing device 110 or server computer 120 if one or more predetermined keywords are detected. Otherwise, in this particular embodiment, the recorded conversation can be deleted after the conversation is terminated. For example, if two parties are discussing a transaction over the phone, then MLMC 112 records the entire conversation, and one party says "I will get this order approved" MLMC 112 will store the entire conversation. In various embodiments, MLMC 112 can store a phone conversation as a voice recording, as a text transcript, or any combination thereof.

In various embodiments, MLMC 112 can store any electronic communications between two or more parties associated with execution ledger 132, authorization ledger 134, billing ledger 136, or any combination thereof on local storage 108, shared storage 124, or any combination thereof. In other embodiments, MLMC 112 can monitor any form of communication between two or more parties associated with execution ledger 132, authorization ledger 134, billing ledger 136, or any combination thereof and store the communication on local storage 108 or shared storage 124 when triggered by a predetermined keyword. In various embodiments, MLMC 112 can determine if a change to one or more ledgers (e.g., execution ledger 132, authorization ledger 134, or billing ledger 136) has occurred, and determine if the authorization for the change to the one or more ledgers is present on the one or more ledgers. In various embodiments, MLMC 112 can resynchronize the one or more ledgers when one or more changes to one or more ledgers are detected by updating the one or more ledgers. In various embodiments, updating the one or more ledgers to resynchronize the one or more ledgers comprises adding one or more additional blocks (e.g., out of band authorization record) to the blockchain when there was an authorization made out of band.

In one example, if the authorization for a change to a ledger is not detected, MLMC 112 can search the tags and metadata of recorded conversations to identify the change that the user that created the ledger, and the parties impacted by the change to the ledger stored on local storage 108 or shared storage 124. In another example, MLMC 112, matches customer numbers and metadata (e.g., date and time) of a recorded conversation to the customer number and metadata of an unauthorized order (e.g., an order that the authorization ledger has no record). In this particular embodiment, the recorded conversation that match the unauthorized order are identified and used to locate authorization information and synchronize the ledgers. In various embodiments, once one or more conversations are located, MLMC 112 can parse and search the identified recorded conversations for authorization information and authorization confirmation associated with the detected change or customer associated with the detected change based on the predetermined keywords, unique identification tag, or any combination thereof. For example, if an order on an authorization ledger associated with Customer A is missing, then MLMC 112 retrieves the conversations uniquely tagged with Customer A information, searches the recorded conversations associated Customer A for the order authorization, retrieves the authorization change, and resynchronizes the ledgers by creating a new block on the authorization ledger that matches the billing ledger and reconciles the order. Further, MLMC 112 may search all conversations regardless of tags and metadata if no authorization is located by the prior search. In another example, MLMC 112 may search all conversations for authorization each time one or more ledgers are out of synchronization. Authorization information is any form of authorization given by the one or more user's known in the art.

Figure 1B:
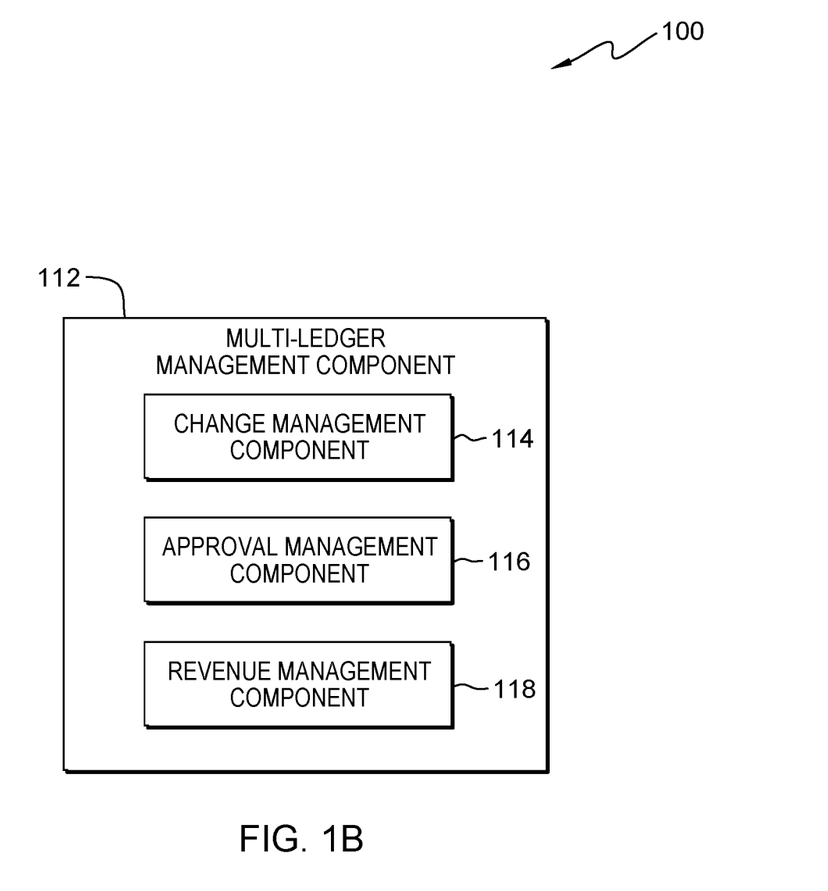
FIG. 1B is a functional block diagram illustrating a multi-ledger management component within the distributed data procession environment of FIG. 1A, in accordance with an embodiment of the present invention.

FIG. 1B is a functional block diagram illustrating MLMC 112 within distributed data processing environment 100 shown in FIG. 1A, in accordance with an embodiment of the present invention. FIG. 1B provides only an illustration of one implementation and does not imply any limitations with regard to the environments in which different embodiments can be implemented. Many modifications to the depicted environment can be made by those skilled in the art without departing from the scope of the invention as recited by the claims.

In various embodiments, MLMC 112 can comprise change management component (CMC) 114, approval management component (AMC) 116, and revenue management component (RMC) 118. In the depicted embodiment, CMC 114, AMC 116, and RMC 118 are housed on MLMC 112. However, in other embodiments, not depicted in FIG. 1A or FIG. 1B, CMC 114, AMC 116, and RMC 118 can each be housed anywhere within distributed data processing environment 100 provided CMC 114, AMC 116, and RMC 118 each are in communication with or connected to MLMC 112, server computer 120, computing device 110, or any combination thereof via network 130. In some embodiments, CMC 114, AMC 116, and RMC 118 can each be standalone components positioned anywhere within distributed data processing environment 100 provided CMC 114, AMC 116, and RCM 118 each are in communication with or connected to MLMC 112, server computer 120, computing device 110, or any combination thereof via network 130.

In various embodiments, CMC 114 can detect that one or more changes has occurred on one or more ledger systems (e.g., execution ledger 132). In various embodiments, CMC 114 can interface with one or more existing ledgers and analyze the likelihood one or more changes has occurred or the likelihood that one or more changes will occur. Additionally, in various embodiments, CMC 114 can compare the current state of one or more blockchains to one or more previous blockchain states to determine if the one or more blockchains are synchronized. For example, comparing the current blockchain configuration to the blockchain configuration documented yesterday to determine if there are any missing blocks in the blockchain. In various embodiments, if CMC 114 determines the one or more ledgers are not synchronized based on the analysis of one or more current and past blockchain registered configurations, then CMC 114 can trigger at least one of: one or more authorization updates or one or more authorization update requests. In various embodiments, when CMC 114 determines one or more ledgers are out of sync, then CMC 114 can trigger an authorization update request by sending the authorization update request AMC 116.

In various embodiments, when a change is detected, CMC 114 can instruct AMC 116, via an authorization update request, to review authorization ledger 134 to determine if an out of band authorization record is recorded on authorization ledger 134. In various embodiments, an out of band authorization record can be any form of authorization (e.g., text, verbal, official document, etc.) known in the art that approves the change to the one or more ledgers via one or more conversations outside of a ledger system. In various embodiments, the detected changed to one or more ledgers can be an order or any form of transaction known in the art. In one particular embodiment, if the authorization is missing then AMC 116 can determine if the authorization was given out of band (e.g., phone call, email, text, instant messaging system, any other form of communication out of band authorization known in the art, or any combination thereof). In various embodiments, if the authorization is located on authorization ledger 134, then AMC 116 can respond to the authorization request from CMC 114 with the authorization, update the authorization records and trigger a reconciliation process. For example, AMC 116 updates the authorization ledger with the out of band authorization record to be in sync with the execution ledger. In various embodiments, CMC 114 can enable a continuous integration and continuous delivery (CI/CD) system to trigger a change after reconciliation.

In various embodiments, AMC 116 can communicate and access authorization ledger 134. In one particular embodiment, AMC 116 can determine if authorization for one or more transactions occurred out of band by reviewing stored authorization records to determine if the authorization records are present for the one or more transactions. In this particular embodiment, if the authorization is not present in the stored authorization records, then AMC 116 can determine that the authorization has occurred out of band and parse and search the stored recorded conversations. In various embodiments, it would be expensive in both storage and computation to record and store every conference call and communication that occurs, thus, MLMC 112, via AMC 116, can determine when to record conference calls, texts, electronic communications, and/or any other communications known in the art by monitoring for predetermined keywords. For example, a severity level 1 ticket is raised on an account, in which AMC 116 records the communication to resolve the issue automatically. In a different example, AMC 116 can resolve the issue by sending the recorded conversation to a user for approval. In another example, AMC 116 can record and store crisis conference calls, wherein crisis conference calls possess a notification and/or trigger setting that enables AMC 116 to automatically record the crisis conference calls. For example, MLMC 112 displaying a prompt to the users in the conversation that the conversation is being recorded or to display the prompt to instruct the users to press the record button.

In a different example, a severity level 1 ticket is raised on an account, in which MLMC 112, via AMC 116, can monitor conversations for predetermined keywords in and when AMC 116 determines it has detected one or more predetermined keywords within the predetermined threshold of confidence. AMC 116 records and stores the conversation and extracts the out of band authorization approval to be submitted to authorization ledger 134. In various embodiments, MLMC 112, via AMC 116, can record every conversation to parse and search for predetermined keywords, in which AMC 116 will only store conversations that have one or more predetermined keywords present. In other embodiments, AMC 116 can send the identified out of band authorization from the recorded conversation to one or more users (e.g., account managers) for approval prior to being stored and recorded in the ledger.

In various embodiments, AMC 116 can use text mining (e.g., text-based collaboration tools) to indicate or determine that a likely voice approval is occurring soon and enable AMC 116 to monitor the scheduled conference call. For example, AMC 116 detects a service provider e-mailing a client, "Do we need to get a window for that?" or "Should we increase the amount of memory?", in which AMC 116 can automatically schedule a recording of the scheduled conference call. In another example, AMC 116 uses a natural language processor to determine that AMC 116 is 99 percent confident that an approval has been given (e.g., AMC 116 detected the predetermined keyword "Approve"). In this particular example, if the confidence level is under a predetermined threshold of confidence, (e.g., 95 percent), then AMC 116 sends the recorded conversation to a user for verification. In various embodiments, AMC 116 can use a natural language processor and a predetermined threshold of confidence to detect predetermined keywords in text (e.g., emails, direct messaging, text messaging, etc.).

In another example, AMC 116 detects two account managers discussing "increasing the amount of memory" and "set up a meeting." In this particular example, AMC 116 anticipates the future conference call and prepares to record the meeting (e.g., future conference call). In various embodiments, AMC 116 can resynchronize ledger 132, billing ledger 136, authorization ledger 134, or any combination thereof, when one or more out of band authorization records is retrieved from the recorded conversations by adding one or more additional blocks to the blockchain. For example, a customer calls a provider requesting an emergency order and the provider approves the order over the phone and forgets to properly log the authorization of the order on the authorization ledger. In this particular example, AMC 116 detects a predetermined keyword and identifies that an authorization for the order is being given over the phone. In this particular example, AMC 116 tags the authorization and stores the out of band authorization record on shared storage 124. In this particular example, when CMC 114 determines there is no authorization record for the order on execution ledger 132, CMC 114 notifies AMC 116, and AMC 116 searches the out of band authorization records for an authorization record tagged with a matching order number or customer ID number. In this particular example, AMC 116 retrieves the matching out of band authorization record (i.e., identified out of band authorization record) from shared storage 124 or local storage 108. In this particular example, AMC 116 automatically creates a new block containing the identified out of band authorization record on the execution ledger and authorization ledger, so the ledgers are in synchronization. In various embodiments, the new block comprises, but is not limited to, the recorded authorization conversation, text transcript comprising the identified one or more predetermined keywords, a link to the recorded authorization conversation, and/or recorded metadata.

In various embodiments, AMC 116 can update execution ledger 132, billing ledger 136, authorization ledger 134, or any combination thereof when one or more out of band authorization records is retrieved from the recorded conversations (e.g., out of band authorization). Additionally, in some embodiments, AMC 116 can instruct execution ledger 132, billing ledger 136, authorization ledger 134, or any combination thereof to each reconcile the detected change if the ledger is affected by the detected change.

In various embodiments, RMC 118 can communicate with and access billing ledger 136. In other embodiments, RMC 118 can communicate and access any other ledger within distributed data processing environment 100. In various embodiments, RMC 118 can receive an update for a ledger (e.g., out of band authorization record) from AMC 116. In this particular embodiment, RMC 118 can update billing ledger 136 and/or reconcile the detected change (e.g., transaction).

In various embodiments, RMC 118, via a revenue leakage engine not shown in FIG. 1B, can track the approved changes and transactions in authorization ledger 134 against the changes and transactions being billed in billing ledger 136 and identify discrepancies between the two. In various embodiments, RMC 118 can trigger additional actions to reconcile between billing ledger 136 and authorization ledger 134. For example, RMC 118 sends a request to AMC 116 to locate and retrieve an authorization record (e.g., out of band authorization record or in band authorization record) for a billing order that is not present on the authorization ledger. In this particular example, AMC 116 locates and retrieves the out of band authorization record and adds an additional block to authorization ledger 134 containing the out of band authorization record.

Figure 2:
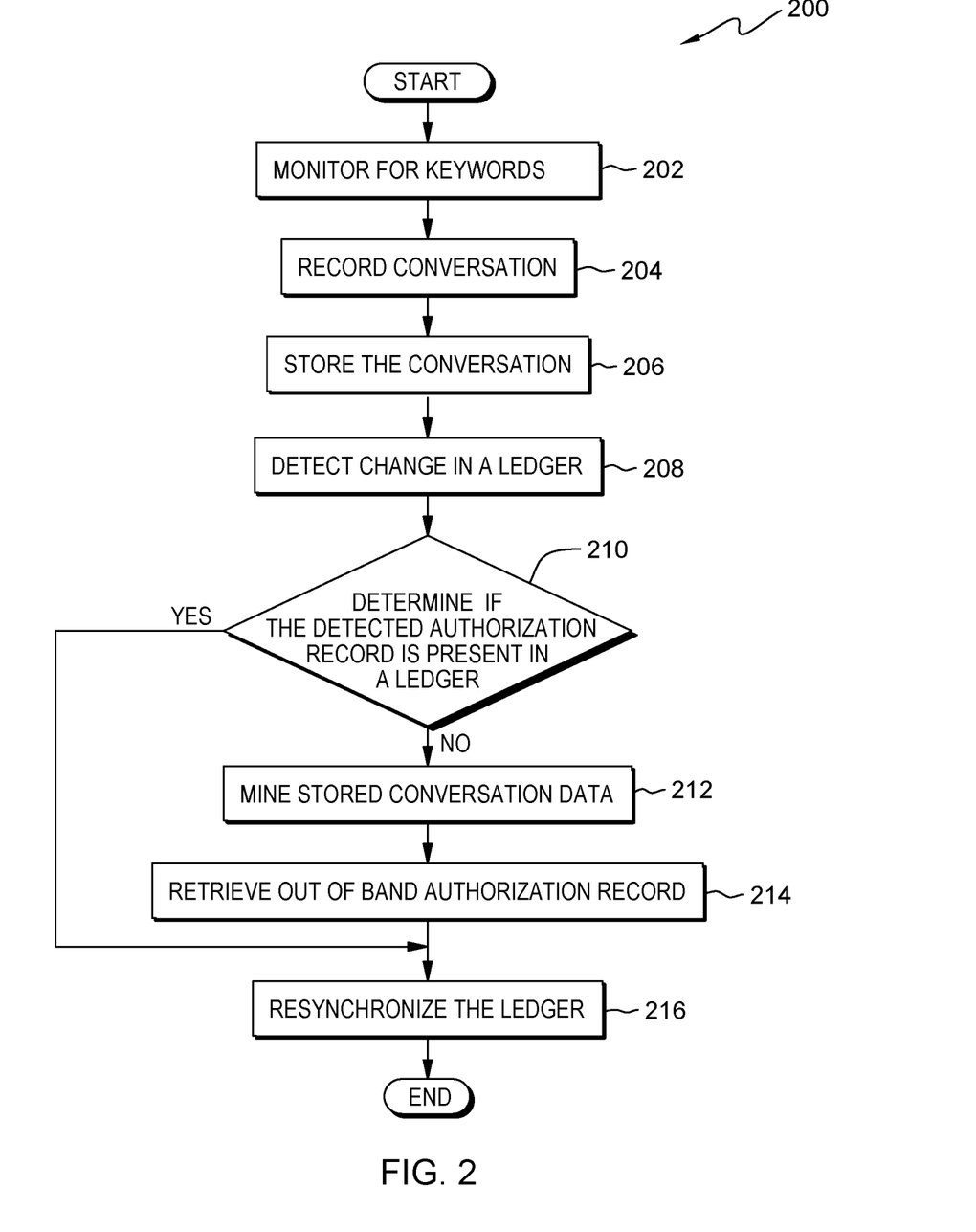
FIG. 2 illustrates operational steps of the multi-ledger management component, in communication with a server within the distributed data processing environment of FIG. 1, for resynchronizing one or more ledgers, in accordance with an embodiment of the present invention.

FIG. 2 illustrates operational steps of MLMC 112, in communication with server computer 120 within distributed data processing environment 100 of FIG. 1 for resynchronizing one or more multiple ledger blockchains. FIG. 2 provides an illustration of one implementation and does not imply any limitations with regard to the environments in which different embodiments can be implemented. Many modifications to the depicted environment can be made by those skilled in the art without departing from the scope of the invention as recited by the claims.

In step 202, MLMC 112 monitors for keywords in a conversation. In various embodiments, MLMC 112, via AMC 116, can continuously monitor conversations between two or more users for one or more predetermined keywords. In various embodiments, a user can edit and update the predetermined keywords.

In step 204, MLMC 112 records the conversation between two users. In various embodiments, MLMC 112, via AMC 116, can record the conversation between two or more users when AMC 116 determines it has detected one or more predetermined keywords within a predetermined range of confidence. For example, a user sets the range of confidence to be between 70 percent confident to 99 percent confident. In this particular example, when MLMC 112 is at least 70 percent confident a user said "authorization" then MLMC 112 will begin recording the conversation. In this particular example, MLMC 112 can label the recorded conversation with the determined range. For example, if MLMC 112 is 85 percent confident the user said "authorization" then recorded authorization file will be labeled as 85 percent confident.

In step 206, MLMC 112 stores the conversation. In various embodiments, MLMC 112, via AMC 116, can tag and store the conversation on one or more databases (e.g., shared storage 124 or local storage 108) such that the recordings can be accessed at a later time. In some embodiments, MLMC 112 can add metadata to the tagged and recorded conversation. In various embodiments, AMC 116 can translate a verbal communication into text.

In step 208, MLMC 112 detects a change to a ledger. In various embodiments, MLMC 112, via CMC 114, can identify one or more changes to execution ledger 132, authorization ledger 134, and billing ledger 136.

In step 210, MLMC 112 determines if the detected authorization record is present in the ledger. In various embodiments, MLMC 112, via CMC 114, can determine if the one or more authorization records, associated with the detected changes, are present or recorded on the one or more ledgers or if the one or more authorization records are stored on shared storage 124. In various embodiments, if CMC 114 determines the one or more authorization records are present on one or more ledgers (Yes step), then MLMC 112 advances to step 216 to resynchronize the one or more ledgers and reconcile the change (e.g., order). However, if CMC 114 is unable to locate the one or more authorization records on the one or more ledgers (No step), then CMC 114 can notify AMC 116, thus triggering AMC 116 to determine if the authorization occurred out of band by reviewing stored conversations.

If one or more authorization records are not detected (no branch, step 210) then in step 212, MLMC 112 mines stored conversation data. In various embodiments, MLMC 112, via AMC 116, can parse and search the stored conversations for the one or more out of band authorization records.

In step 214, MLMC 112 retrieves the out of band authorization record. In various embodiments, MLMC 112, via AMC 116, can retrieve one or more out of band authorization records from one or more stored conversations stored on shared storage 124 or local storage 108. In various embodiments, AMC 116 can utilize the unique identification tag, and/or one or more predetermined keywords associated with the one or more identified changes to retrieve the one or more out of band authorization records.

If one or more authorization records are detected (yes branch, step 210) then in step 216, MLMC 112 resynchronizes the ledger. In various embodiments, MLMC 112, via AMC 116, can resynchronize one or more ledgers (execution ledger 132, billing ledger 136, or authorization ledger 134) when one or more out of band authorization records are retrieved. In various embodiments, MLMC 112, via AMC 116, resynchronizes one or more ledgers by updating the one or more ledgers. The one or more ledgers are updated by creating one or more new blocks containing the one or more out of band authorization records to correspond with the one or more detected changes. In various embodiments, MLMC 112 via AMC 116 reconciles one or more ledgers based on the retrieved one or more out of band authorization records. In various embodiments, MLMC 112, via, AMC 116 can resynchronize execution ledger 132, billing ledger 136, and/or authorization ledger 134 when one or more out of band authorization records is retrieved from the recorded conversations (e.g., out of band authorizations).

Figure 3:
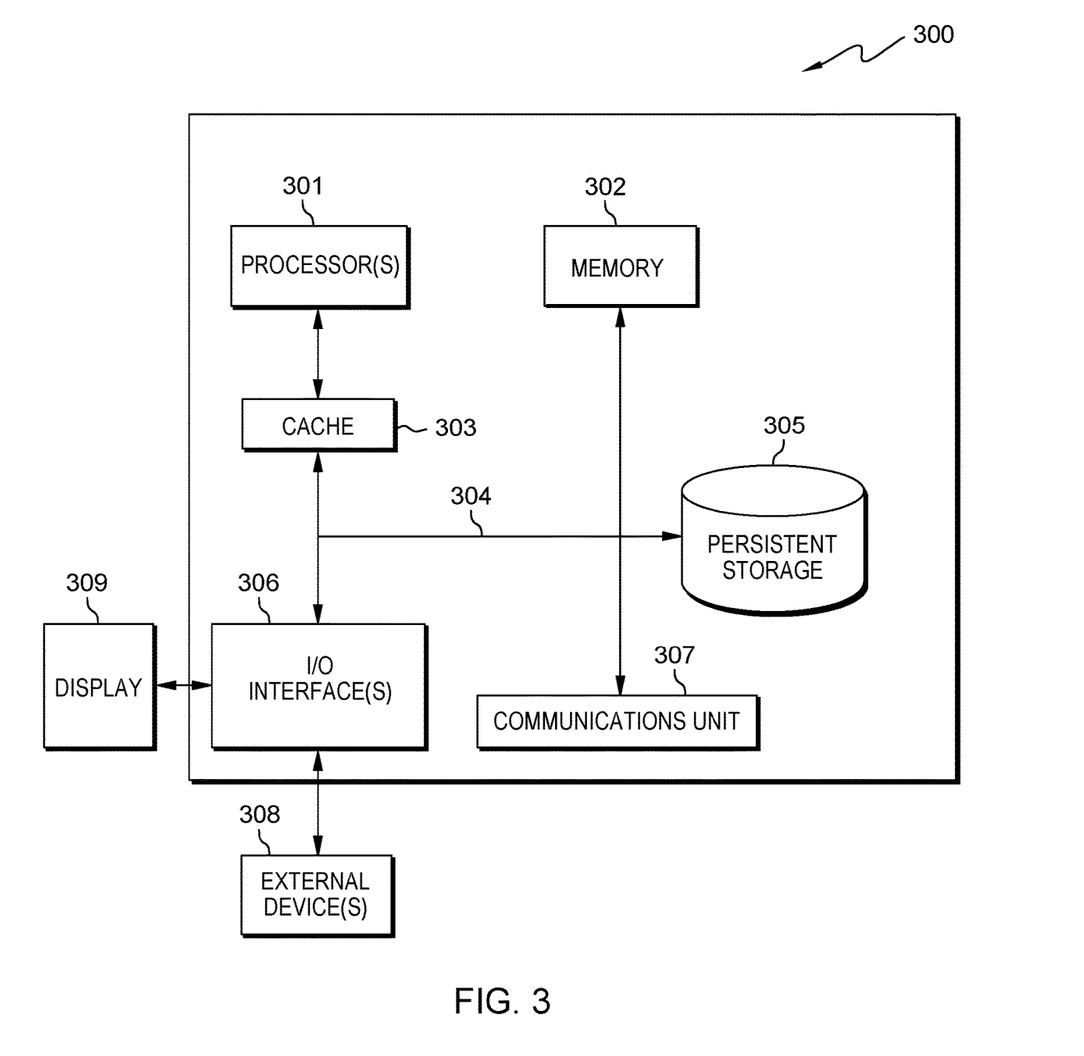
FIG. 3 depicts a block diagram of components of the server computer executing the multi-ledger component within the distributed data processing environment of FIG. 1, in accordance with an embodiment of the present invention.

FIG. 3 depicts a block diagram of components of computing device 110 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

FIG. 3 depicts computer system 300, where computing device 110 represents an example of computer system 300 that includes MLMC 112. The computer system includes processors 301, cache 303, memory 302, persistent storage 305, communications unit 307, input/output (I/O) interface(s) 306, display 309, external device(s) 308 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention can be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 can also be removable. For example, a removable hard drive can be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 can provide communications through the use of either or both physical and wireless communications links. Program instructions and data used to practice embodiments of the present invention can be downloaded to persistent storage 305 through communications unit 307.

I/O interface(s) 306 enables for input and output of data with other devices that can be connected to each computer system. For example, I/O interface 306 can provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and can be, for example, a computer monitor.

What is claimed is:

1. A computer-implemented method for ledger synchronization, the method comprising:
monitoring one or more conversations for one or more keywords;
identifying the one or more keywords in a user conversation within a predetermined range of confidence;
recording, by the one or more processors, at least a portion of the one or more conversations that includes the identified one or more keywords;
storing, by the one or more processors, one or more recorded conversations, based on the at least portion of the one or more conversations that include the one or more keywords, in a database;
storing customer information, authorization information, and transaction information as metadata;
detecting one or more changes to a plurality of ledgers;
determining one or more authorization records is absent on the plurality of ledgers for the one or more changes;
determining at least one of the one or more stored conversations includes authorization records associated with the one or more detected changes;
retrieving the determined at least one of the one or more stored conversations to verify authorization approval; and
synchronizing the plurality of ledgers by creating a new block to the plurality of ledgers indicating authorization for the new block based on the determined at least one of the one or more stored conversations, wherein the block is an out of band authorization record; and
reconciling one or more transactions based on the out of band authorization record.

2. The computer-implemented method of claim 1, wherein determining at least one of the one or more stored conversations includes authorization records associated with the one or more detected changes further comprises:
searching the one or more recorded conversations for a unique tag and the metadata that indicates an association to the absent one or more authorization records;
identifying one or more recorded conversations that indicate an association to the one or more absent authorization records;
parsing, by the one or more computer processors, via natural language processing, the identified one or more recorded conversations that indicate an association; and
based at least on the parsing, determining, by the one or more computer processors, that at least one of the identified one or more recorded conversations contains authorization for the one or more changes.

3. The computer-implemented method of claim 2, further comprising:
searching the identified one or more recorded conversations for authorization information, wherein searching the identified one or more recorded conversations comprises:
parsing the identified one or more recorded conversations for authorization information; and
based at least on the parsing identifying authorization information in the identified one or more recorded conversation, wherein the identified authorization information is used to synchronize the plurality of ledgers.

4. The computer-implemented method of claim 1, wherein storing the one or more recorded conversations further comprises tagging the one or more recorded conversations with one or more unique identification tags.

5. The computer-implemented method of claim 4, wherein the one or more unique identification tags comprise information associated with the: customer, customer name, customer number, user name, user identification (ID), phone number, email address, predetermined keywords, content of text transcript, and date and time of conversation.

6. The computer-implemented method of claim 1, further comprising:
sending one or more authorization records to one or more users for approval prior to being recorded on the plurality of ledgers.

7. The computer-implemented method of claim 1, further comprising:
tracking one or more approved changes and one or more transactions in the plurality of ledgers against the changes to a different plurality of ledgers; and
identifying discrepancies between the plurality of ledgers and the different plurality of ledgers by comparing one or more blocks.

8. The computer-implemented method of claim 1, further comprising:
searching identified one or more recorded conversations for authorization information, wherein searching the identified recorded conversations comprises:
parsing the identified one or more recorded conversations for authorization information; and
based at least on the parsing of the identified one or more recorded conversations identifying authorization information in the identified one or more recorded conversation, wherein the identified authorization information is used to synchronize the plurality of ledgers.

9. A computer program product for ledger synchronization, the computer program product comprising:
one or more computer readable storage devices and program instructions stored on the one or more computer readable storage devices, the stored program instructions comprising:
program instructions to monitor one or more conversations for one or more keywords;
program instructions to identify the one or more keywords in a user conversation within a predetermined range of confidence
program instructions to record at least a portion of the one or more conversations that includes the identified one or more keywords;
program instructions to store one or more recorded conversations, based on the at least portion of the one or more conversations that include the one or more keywords, in a database;
program instructions to store customer information, authorization information, and transaction information as metadata;
program instructions to detect one or more changes to plurality of ledgers;
program instructions to determine one or more authorization records is absent on the plurality of ledgers for the one or more changes;
program instructions to determine at least one of the one or more stored conversations includes authorization records associated with the one or more detected changes;
program instructions to retrieve the determined at least one of the one or more stored conversations to verify authorization approval; and
program instructions to synchronize the plurality of ledgers by creating a new block to the plurality of ledgers indicating authorization for the new block based on the determined at least one of the one or more stored conversations, wherein the block is an out of band authorization record; and program instructions to reconcile one or more transactions based on the out of band authorization record.

10. The computer program product of claim 9, wherein program instructions to determine at least one of the one or more stored conversations includes authorization records associated with the one or more detected changes further comprises:

program instructions to search the one or more recorded conversations for a unique tag and the metadata that indicates an association to the absent one or more authorization records;

program instructions to identify one or more recorded conversations that indicate an association to the absent authorization record;

program instructions to parse via natural language processing, the identified one or more recorded conversations that indicate an association; and based at least on the parsing, program instructions to determine that at least one of the identified one or more recorded conversations contains authorization for the one or more changes.

11. The computer program product of claim 10, further comprising:

program instructions to search the identified one or more recorded conversations for authorization information, wherein searching the identified one or more recorded conversations comprises:

program instructions to parse the identified one or more recorded conversations for authorization information; and based at least on the parsing program instructions to identify authorization information in the identified one or more recorded conversation, wherein the identified authorization information is used to synchronize the plurality of ledgers.

12. The computer program product of claim 9, wherein storing the one or more recorded conversations further comprises tagging the one or more recorded conversations with one or more unique identification tags, wherein the one or more unique identification tags comprise: customer name, customer number, user name, user identification (ID), phone number, email address, predetermined keywords, content of text transcript, and date and time of conversation.

13. The computer program product of claim 9, further comprising:

program instructions to send one or more authorization records to one or more users for approval prior to being recorded on the plurality of ledgers.

14. The computer program product of claim 9, further comprising:

program instructions to track one or more approved changes and one or more transactions in the plurality of ledgers against the changes to a different plurality of ledgers; and program instructions to identify discrepancies between the plurality of ledgers and the different plurality of ledgers by comparing one or more blocks.

15. The computer program product of claim 9, further comprising:

program instructions to search identified one or more recorded conversations for authorization information, wherein searching the identified recorded conversations comprises:

program instructions to parse the identified one or more recorded conversations for authorization information; and based at least on the parsing of the identified one or more recorded conversations program instructions to identify authorization information in the identified one or more recorded conversation, wherein the identified authorization information is used to synchronize the plurality of ledgers.

16. A computer system for ledger synchronization, the computer system comprising:

one or more computer processors;

one or more computer readable storage devices;

program instructions stored on the one or more computer readable storage devices for execution by at least one of the one or more computer processors, the stored program instructions comprising:

program instructions to monitor one or more conversations for one or more keywords;

program instructions to identify the one or more keywords in a user conversation within a predetermined range of confidence program instructions to record at least a portion of the one or more conversations that includes the identified one or more keywords;

program instructions to store one or more recorded conversations, based on the at least portion of the one or more conversations that include the one or more keywords, in a database;

program instructions to store customer information, authorization information, and transaction information as metadata;

program instructions to detect one or more changes to plurality of ledgers;

program instructions to determine one or more authorization records is absent on the plurality of ledgers for the one or more changes;

program instructions to determine at least one of the one or more stored conversations includes authorization records associated with the one or more detected changes;

program instructions to retrieve the determined at least one of the one or more stored conversations to verify authorization approval; and program instructions to synchronize the plurality of ledgers by creating a new block to the plurality of ledgers indicating authorization for the new block based on the determined at least one of the one or more stored conversations, wherein the block is an out of band authorization record; and program instructions to reconcile one or more transactions based on the out of band authorization record.

17. The computer system of claim 16, wherein program instructions to determine at least one of the one or more stored conversations includes authorization records associated with the one or more detected changes further comprises:

program instructions to search the one or more recorded conversations for a unique tag and the metadata that indicates an association to the absent one or more authorization records;

program instructions to identify one or more recorded conversations that indicate an association to the absent authorization record;

program instructions to parse via natural language processing, the identified one or more recorded conversations that indicate an association;

based at least on the parsing, program instructions to determine that at least one of the identified one or more recorded conversations contains authorization for the one or more changes; and program instructions to search the identified one or more recorded conversations for authorization information, wherein searching the identified one or more recorded conversations comprises:

program instructions to parse the identified one or more recorded conversations for authorization information; and based at least on the parsing program instructions to identify authorization information in the identified one or more recorded conversation, wherein the identified authorization information is used to synchronize the plurality of ledgers.

18. The computer system of claim 16, wherein storing the one or more recorded conversations further comprises tagging the one or more recorded conversations with one or more unique identification tags, wherein the one or more unique identification tags comprise: customer name, customer number, user name, user identification (ID), phone number, email address, predetermined keywords, content of text transcript, and date and time of conversation.

19. The computer system of claim 16, further comprising:

program instructions to track one or more approved changes and one or more transactions in the plurality of ledgers against the changes to a different plurality of ledgers; and program instructions to identify discrepancies between the plurality of ledgers and the different plurality of ledgers by comparing one or more blocks.

20. The computer system of claim 16, further comprising:

program instructions to search identified one or more recorded conversations for authorization information, wherein searching the identified recorded conversations comprises:

program instructions to parse the identified one or more recorded conversations for authorization information; and based at least on the parsing of the identified one or more recorded conversations program instructions to identify authorization information in the identified one or more recorded conversation, wherein the identified authorization information is used to synchronize the plurality of ledgers.

* * * * *